Jan. 24, 1956  R. E. DEEBEL  2,732,223
SELF-LATCHING TRAILER HITCH
Filed Dec. 10, 1954  2 Sheets-Sheet 1
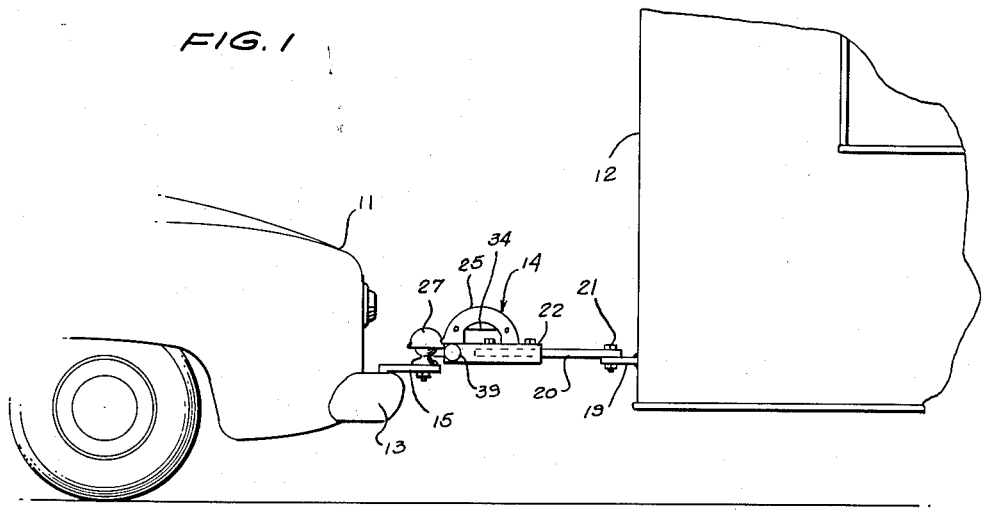
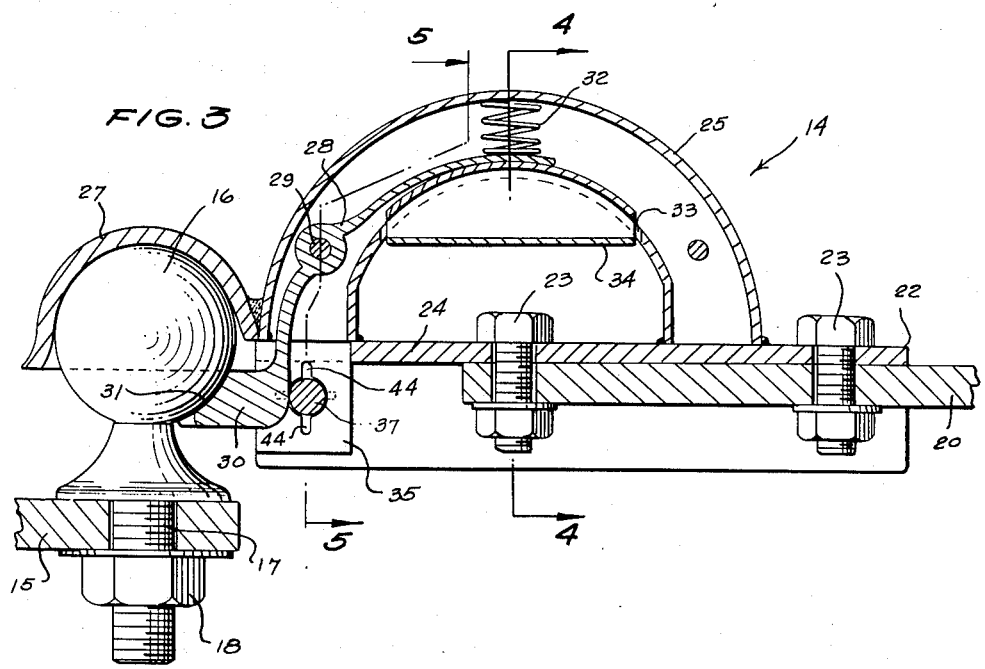
INVENTOR.
ROBERT E. DEEBEL
BY
McMorrow, Berman & Davidson
ATTORNEYS Jan. 24, 1956    R. E. DEEBEL    2,732,223
SELF-LATCHING TRAILER HITCH
Filed Dec. 10, 1954    2 Sheets-Sheet 2
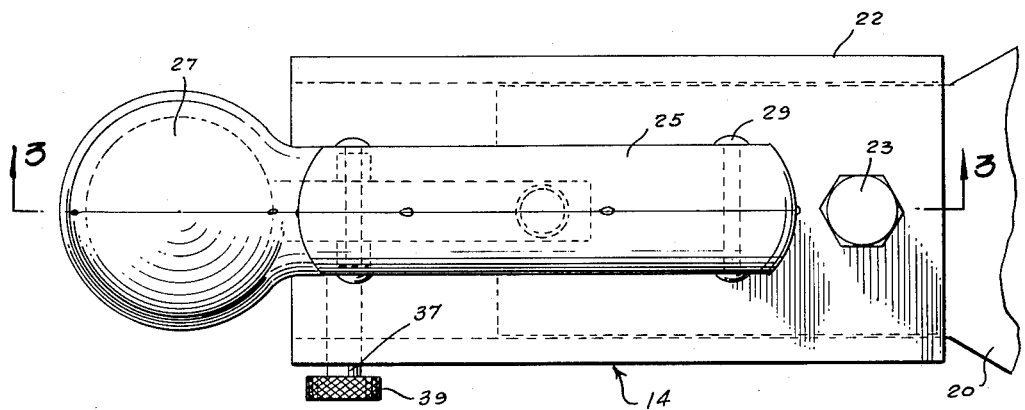
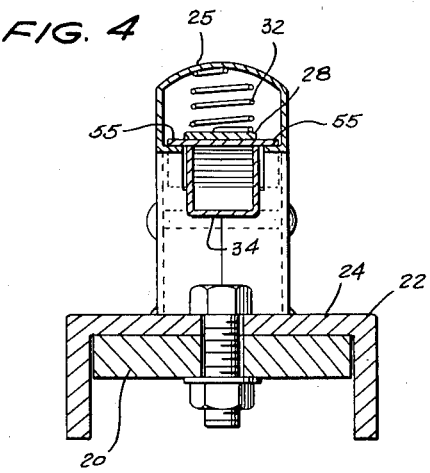
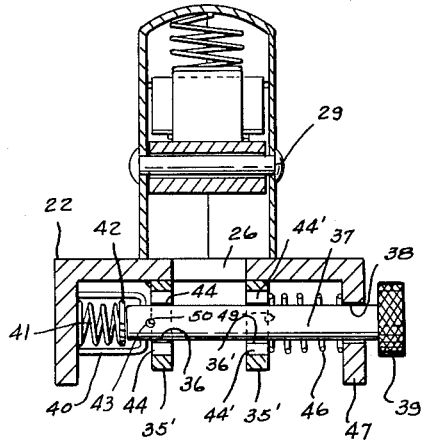
INVENTOR.
ROBERT E. DEEBEL
BY
McMorrow, Berman & Davidson
ATTORNEYS & # United States Patent Office 2,732,223
Patented Jan. 24, 1956

2,732,223

SELF-LATCHING TRAILER HITCH

Robert E. Deebel, Torrance, Calif.

Application December 10, 1954, Serial No. 474,395

1 Claim. (Cl. 280—512)

This invention relates to trailer hitch mechanisms, and more particularly to an improved self-latching hitch device for connecting a trailer to a towing vehicle.

A main object of the invention is to provide a novel and improved self-latching trailer hitch device which is simple in construction, which is easy to install, and which provides a secure connection between a trailer and the vehicle towing the trailer.

A further object of the invention is to provide an improved self-latching trailer hitch device which is inexpensive to fabricate, which is durable in construction, which provides a reliable and secure connection between a trailer and the vehicle towing same, and which is provided with means for readily disconnecting the trailer from the towing vehicle when desired.

Further objects and advantages of the invention will become apparent from the following description and claim, and from the accompanying drawings, wherein:

Figure 1 is a side elevational view showing the rear portion of an automobile and the forward portion of a trailer, and further showing an improved trailer hitch device according to the present invention employed to connect the trailer to the automobile.

Figure 2 is an enlarged top plan view of the trailer hitch device shown in Figure 1.

Figure 3 is a longitudinal vertical cross sectional view taken on the line 3—3 of Figure 2.

Figure 4 is a transverse vertical cross sectional view taken on the line 4—4 of Figure 3.

Figure 5 is a transverse vertical cross sectional view taken on the line 5—5 of Figure 3.

Referring to the drawings, 11 designates a motor vehicle and 12 designates a trailer which is connected to the rear bumper 13 of the motor vehicle by an improved hitch device according to the present invention designated generally at 14.

Secured to the rear bumper 13 in any suitable manner is a horizontally extending hitch bar 15 on which is mounted the upstanding hitch ball 16, said hitch ball having a threaded shank 17 passing through the hitch bar 15 and secured thereto by a suitable nut 18, as is clearly shown in Figure 3.

The forward end of the trailer 12 is provided with the rigid, horizontally extending bar member 19 to which is pivotally connected the hitch tongue 20, as by a vertical pivot bolt 21, shown in Figure 1. The forward portion of the hitch tongue 20 is received in a channel bar 22 and is secured therein by a pair of longitudinally spaced bolts 23, 23, as shown in Figure 3, the hitch tongue 20 being clamped against the top wall 24 of the channel bar 22.

Rigidly secured on the top wall 24 of the bar 22 and extending longitudinally thereof is a hollow arcuate housing 25 which has its forward end secured over a marginal notch 26 formed in the forward margin of the top wall 24 of channel bar 22. Rigidly secured to the forward end of the arcuate housing 25 is a downwardly facing, generally hemispherical socket member 27 which is adapted to receive the hitch ball 16 in the manner illustrated in Figure 3.

Designated at 28 is a lever which is positioned in the forward portion of the arcuate housing 25 and which is pivoted to said forward portion at the intermediate portion of the lever, as shown at 29, the forward end of the lever 28 extending downwardly through the end of the housing 25 and through the notch 26, as shown in Figure 3. The forward end portion of the lever 28 is formed with the generally horizontally directed end lug 30 which is arranged to underlie the socket 27 and which is formed with a concave surface 31 shaped to engage the lower portion of the surface of the spherical hitch ball 16 in the manner illustrated in Figure 3.

The rear portion of the lever 28 is generally arcuate in shape and extends rearwardly substantially past the intermediate portion of the arcuate housing 25, as shown in Figure 3, the lever 28 being biased clockwise, as viewed in Figure 3, by a coiled spring 32 having its top end secured to the top wall portion of the housing 25 and bearing at its lower end on the end portion of the lever 28. Thus, the spring 32 biases the ball-engaging member 30 into engagement with the lower portion of the surface of the hitch ball 16 when the ball is positioned in the socket 27.

The intermediate portion of the housing 25 is formed at its lower wall with the longitudinally extending slot 33 in which is positioned a hollow, elongated plunger member 34, the top portion of said plunger member extending slidably through the slot 33 and being formed with the respective retaining flange elements 55, 55 extending laterally on opposite sides of the slot 33 to retain the plunger member in the slot and to limit downward movement of the plunger member to the position thereof shown in Figures 3 and 4.

As will be readily apparent from Figure 3, the rear portion of the lever 28 bears on the top surface of the plunger member 34, urging said plunger member downwardly.

As will be further apparent, when the intermediate portion of the housing 25 is grasped, whereby the fingers of the hand grasping said housing member underlie the plunger member 34, when squeezing pressure is exerted, the plunger member 34 is elevated, causing the lever 28 to be rotated counterclockwise, as viewed in Figure 3, against the force of the spring 32, causing the locking lug 30 to be moved rearwardly, thereby releasing the socket 27 for disconnection from the ball 16.

Rigidly secured to the under surface of the top wall 24 of the channel bar 22 at the opposite sides of the notch 26, and depending vertically therefrom in parallel relationship are the respective lugs 35', 35', said lugs being formed with respective apertures 36, 36' through which extends the transverse locking pin 37, said locking pin also extending through an aperture 38 provided in one of the side flanges of the channel bar 22, as shown in Figure 5. The locking pin 37 is provided with the knurled head 39, and the end portion of the locking pin extends into a spring-retaining housing 40 containing a coiled spring 41 arranged in axial alignment with the locking pin and having the abutment washer 42 secured to its end, as shown in Figure 5, said abutment washer being engageable against the end of the locking pin. The locking pin 37 is provided with the transversely extending retaining pin element 43 which is engageable against the left side surface of the lug 35', as viewed in Figure 5, to hold the locking pin against movement to the right, said pin element 43 being biased against the surface of lug 35' adjacent the aperture 36 by the force of the spring 41.

As is clearly shown in Figure 3, the transverse locking pin 37 is arranged immediately behind the locking lug element 30 of the lever 28, so that said locking lug element is secured in the position shown in Figure 3, namely, with its surface 31 engaging against the lower portion of the surface of the hitch ball 16, to secure the member 30 against movement away from the hitch ball.

The lug 35' is provided with the upper and lower slot portions 44, 44 communicating with the aperture 36, and adapted to provide a passage for the transverse pin element 43 therethrough when the locking pin 37 is rotated 90° from the position thereof shown in Figure 5. The lug 35' is similarly formed with top and bottom vertical slot portions 44' to provide a passage therethrough for the pin element 43 when the locking pin 37 is retracted.

Designated at 46 is a coiled spring which is disposed around the pin 37 in the space between the lug 35' and the adjacent depending side flange 47 of the channel bar 22. The transverse pin element 43 is of sufficient length to engage with the end of the coiled spring 46 when the pin 37 is sufficiently retracted, the spring 46 serving to hold the respective ends of the pin element 43 in respective radial grooves or seats 49 provided in the wall surface of the lug 35', said grooves 49 being spaced 90° from the respective slots 44', whereby the pin 43 may be seated in said grooves after being rotated 90° subsequent to the passage of the pin through the slots 44' when the locking member 37 is sufficiently retracted.

Similar seats 50 are provided in the surface of the lug 35 adjacent the spring-retaining housing 40 to receive the opposite end portions of the transverse pin element 43 when the locking member 37 is in the position thereof shown in Figure 5.

As above explained, the lever 28 is locked in its ball-engaging position, namely, the position shown in Figure 3, by the pin element 37 when said pin element is in its normal position, illustrated in Figures 3 and 5. To release the lever, the transverse pin member 37 is rotated 90°, retracted so that the transverse pin 43 thereof passes through the slots 44 and 44', and is then rotated another 90° so that the transverse pin element 43 seats in the grooves 49. Under these conditions the lever 28 is free to rotate counterclockwise, as viewed in Figure 3, and may be so rotated by grasping the housing 25 and exerting squeezing pressure on the plunger member 34, as above explained, to elevate the plunger member 34 and to rotate the lever 28 counterclockwise. With the lever 28 rotated counterclockwise, from the position thereof shown in Figure 3, whereby the locking lug 30 is moved away from the ball 16, the socket 27 may be lifted off the ball 16 to disconnect the trailer 12 from the towing vehicle 11. To connect the trailer to the vehicle the above procedure is reversed, the housing 25 and plunger 34 being grasped to elevate the plunger and to rotate the lever 28 so that the socket 27 may be lowered onto the ball 16, after which the housing 25 and plunger 34 are released, allowing the locking lug 30 of lever 28 to move into a position engaging the lower portion of the hitch ball 16. The pin 37 may be then returned to the position thereof shown in Figures 3 and 5, thereby locking the lever 28 against subsequent movement.

While a specific embodiment of an improved trailer hitch device has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A trailer hitch comprising a ball, a hollow arcuate housing, a socket member secured to one end of said housing and being adapted to receive said ball, a lever pivoted at its intermediate portion in said housing, a locking element on one end of said lever extending subjacent said socket member and being lockingly engageable with said ball, spring means in said housing biasing said lever into locking engagement with said ball, and a manually actuated plunger element movably mounted in said housing beneath the other end of said lever, said plunger element projecting below the intermediate portion of said housing and being movable upwardly to rotate said lever in a direction to disengage said locking element from said ball.

References Cited in the file of this patent

UNITED STATES PATENTS

| 2,435,024 | Wagner | Jan. 27, 1948 |

FOREIGN PATENTS

| 46,919 | France | Nov. 7, 1936 |
| 410,095 | Great Britain | May 7, 1934 |